US006245446B1

(12) United States Patent
Schier et al.

(10) Patent No.: US 6,245,446 B1
(45) Date of Patent: Jun. 12, 2001

(54) WEAR PROTECTION LAYER

(75) Inventors: Veit Schier; Helmut Holleck, both of Karlsruhe (DE)

(73) Assignee: Forschungszentrum Karlsruhe GmbH, Karlsruhe (DE)

( * ) Notice: Subject to any disclaimer, the term of this patent is extended or adjusted under 35 U.S.C. 154(b) by 0 days.

(21) Appl. No.: 08/903,682

(22) Filed: Jul. 31, 1997

Related U.S. Application Data

(63) Continuation-in-part of application No. PCT/EP95/04968, filed on Dec. 15, 1995.

(30) Foreign Application Priority Data

Feb. 1, 1995 (DE) .............................................. 195 03 070

(51) Int. Cl.$^7$ ...................................................... B32B 15/04
(52) U.S. Cl. .......................... 428/627; 428/472; 428/698; 428/699
(58) Field of Search ..................................... 428/627, 469, 428/472, 698, 699, 212, 213

(56) References Cited

U.S. PATENT DOCUMENTS

| | | | | |
|---|---|---|---|---|
| 4,835,062 | * | 5/1989 | Holleck | 428/469 |
| 5,182,238 | * | 1/1993 | Holleck | 501/91 |
| 5,656,364 | * | 8/1997 | Rickerby et al. | 428/216 |
| 5,700,551 | * | 12/1997 | Kukino et al. | 428/212 |
| 5,882,777 | * | 3/1999 | Kukimo et al. | 428/216 |

FOREIGN PATENT DOCUMENTS

| | | |
|---|---|---|
| 35 12 986 | 10/1986 | (DE) . |
| 41 15 616 | 9/1992 | (DE) . |
| 0 179 582 | 4/1986 | (EP) . |
| 0 589 641 | 3/1994 | (EP) . |
| 592986 * | 4/1994 | (EP) . |
| WO 95/02078 | 1/1995 | (WO) . |

* cited by examiner

*Primary Examiner*—Deborah Jones
*Assistant Examiner*—Bryant Young
(74) *Attorney, Agent, or Firm*—Klaus J. Bach

(57) ABSTRACT

In a wear protection layer comprising, disposed on a substrate, a plurality of individual layers including a first individual layer of a metallic hard material disposed directly on the substrate, periodically repeated composite arrangements of three individual layers comprising two individual layers of different metallic hard materials and one individual layer consisting of a covalent hard material are disposed on the first individual layer of a metallic hard material whereby the mechanical, physical and chemical properties of the metallic hard materials are combined with the properties of the covalent hard materials.

5 Claims, 3 Drawing Sheets

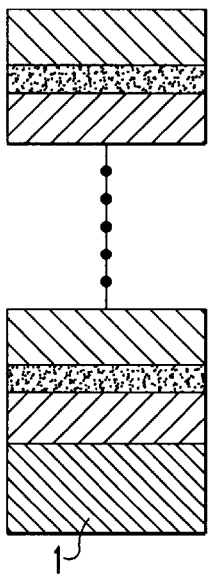 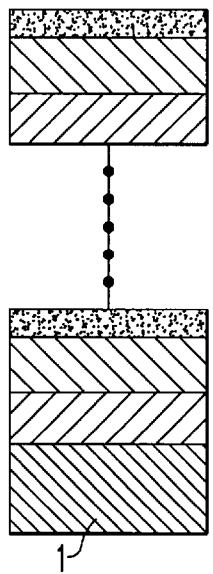 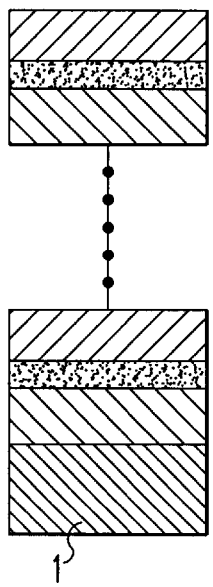 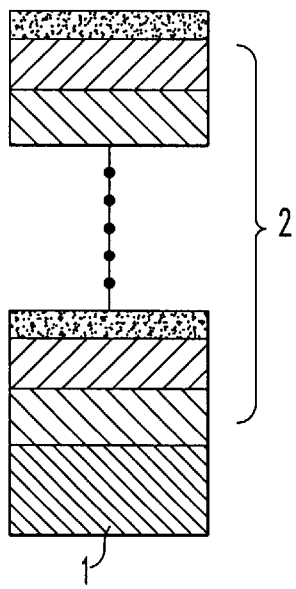
*FIG.1a*  *FIG.1b*  *FIG.1c*  *FIG.1d*
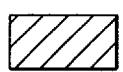  
TiN   B4C   TiC

WEAR PROTECTION LAYER

This is a CIP application of International application PCT/EP95/04968 filed Dec. 15, 1995 and claiming priority of German patent application 195 03 070.2 filed Feb. 1, 1995.

BACKGROUND OF THE INVENTION

The invention resides in a wear protection coating comprising of a plurality of layers including a first layer of a metallic hard material dispose directly on a substrate and additional layers disposed on the first metallic hard material layer including in a periodic repetitive arrangement metallic hard and non-metallic materials.

Such a wear protection layer is known for example from DE AS 29 17 348. This patent publication discloses a compound body comprising a base with one or several hard metal layers of different composition without bonding metals, each having a thickness of 1 to 50 $\mu$m. One of the hard material layers with thickness of 0.02 to 0.1 $\mu$m (20 to 100 nm) each, wherein the hard material composition of each individual layer is different from the hard material composition of the two adjacent single layers. A preferred embodiment of the wear protection layer resides in a first layer of titanium-carbide disposed on the base on which alternately a multitude of layers of the metallic hard materials titanium carbide, titanium nitrate or titanium carbon nitride on one hand, and, on the other hand, the heteropolar hard materials aluminum oxide or zirconium oxide are disposed. The final outer layer may comprise aluminum oxide with a small nitrogen content.

Another wear protection layer is known from DE 3512986 Al. The various layers of metallic hard material may be combinations of the following metallic hard materials: TiC/TiN; TiC/TiB$_2$; TiN/TiB$_2$; TiB$_2$/WC; TiB$_2$/Ti (C$_1$N); TiB$_2$/Ti$_1$V)C; TiB$_2$/(Ti,W)C; (Ti,V)B$_2$//(Ti,V)C; (Ti, Nb)B$_2$/(Ti,Nb); VB$_2$/TiN; VB$_2$/WC; HfB$_2$/TaC; ZrB$_2$/TaC or ZrB$_2$/NbC.

It is important that there is a large number of interfaces in the complete layer structure. This provides for a tension-free tenacious protection layer which has good adherence to the base and is very wear resistant. Such wear protection layers are particularly suitable for the coating of metal cutting tools. The wear protection layer can be formed by cathode sputtering wherein several cathodes of various hard metallic material are used and the substrate (base) is disposed on a rotating plate, moved periodically through the deposit areas of the various cathodes.

EP 0 006 534 A2 disclose a wear protection layer which comprises at least five, but preferably more than ten, individual layers of which at least two have different compositions. The first layer disposed on the substrate consists of a carbide and the final outermost layer consists of a boride or a carbide and the intermediate layers comprise carbides, nitrides, oxides, borides or mixtures thereof. As carbides and nitrides, especially compounds with the elements Hf, Zr, Ta and titanium are proposed which are metallic hard materials. The borides preferably comprise compounds including Hf, Ta, Ti, Zr, and N. As oxides the heteropolar hard metals Al—, Hf—, Zr—, Be— and titanium-oxide are proposed.

DE 31 52 742 C2 discloses a cutting tool with a multilayer coating. The layers of the coating consist of a nitride or carbide of a metal of the IV. side group of the periodic system (Ti, Zr, Hf) and of a nitride, carbide, boride or silicide of a metal of the VI. (side) group (Cr, MO, W). These compounds include elements of the group of the hard metals. The layers are disposed alternately in relatively large numbers, the thicknesses of the metal compounds of the IV. group being 0.05 to 0.5 $\mu$m and the thicknesses of the metal layer of the VI. group being 15 to 40% of the layer thicknesses of the metal compounds of the IV. group. The coating comprises up to 500 individual layers.

It is the object of the present invention to provide a wear protection layer which comprises a plurality of individual layers wherein the mechanical, physical and chemical properties of hard metal materials are combined with those of other hard materials. Furthermore, the wear protection layer should have a very low friction coefficient with regard to ceramic and metallic friction partners and a hardness of over 4000 HVO,05.

SUMMARY OF THE INVENTION

In a wear protection layer comprising, disposed on a substrate, a plurality of individual layers including a first individual layer of a metallic hard material disposed directly on the substrate, periodically repeated composite arrangements of three individual layers comprising two individual layers of different metallic hard materials and one individual layer consisting of a covalent hard material are disposed on the first individual layer of a metallic hard material whereby the mechanical, physical and chemical properties of the metallic hard materials are combined with the properties of the covalent hard materials.

The group of metallic hard materials comprises the borides, carbides and nitrides of the transition metals, particularly titanium nitride and titanium carbide as well as the mixed crystals thereof. The covalent hard materials include the borides and nitrides of aluminum, silicon and boron as well as diamond.

The combination of metallic and covalent hard materials in a single layer facilitates the utilization of the different mechanical, physical and chemical properties of the hard materials. By the periodically alternating arrangement of single layers of these hard materials the mechanical properties (hardness toughness, adhesion) and the chemical behavior (high-temperature corrosion, diffusion, oxidation) of multi-layer coatings are optimized.

Covalent hard materials are basically unsuitable as single layers on metallic substrates for metal cutting operations or, because of the high covalent bonding part, they cannot be used as jointure material since they do not adhere well to metallic substrates, they are brittle and they have high internal tensions. However with the arrangement of the covalent hard material layers according to the invention these negative properties are eliminated. The internal tension can be greatly reduced by a small thickness of the individual layers of covalent hard materials whereby their mechanical stability and adhesion is substantially improved. The thickness of the individual layers of the covalent hard material should be almost one half, but preferably less than one fifth of the thickness of the individual layers of the metallic hard material, preferably between 1 and 30 nm or, even better, between 1 and 5 nm. The individual layers of the metallic hard material can have a thickness of up to 500 nm. Inspite of their comparatively small thickness, the periodically arranged individual layers of covalent hard material provide for a substantial increase in hardness of the whole wear protection layer.

The first individual layer of the wear protection layer disposed on the substrate comprises a metallic hard material preferably TiN, or TiC. These hard materials adhere particularly well to the steels and hard metals generally used for making tools. On the first individual layer, there is disposed a series of additional individual layers of metallic and covalent hard materials. All individual layers together form a multiply repeated combination of three individual layers, in such a way that a second combination of three individual layers is attached to the first combination and at least a third combination is attached to the second combination of three individual layers. The combination of the three individual layers comprises two individual layers of two different metallic hard materials such as TiN and TiC and a single layer of the covalent hard material. The number of covalent hard material layers should be at least three; the wear protection layer consequently comprises at least 9 individual layers. For the individual layers of the covalent hard material, the compounds $B_4C$, $Si_3N_4$, BN, Sialon (mixed crystal $(SiAl)_3$, $(N,O)_4$, carbon, $CB_xN_y$, $CN_x$ and mixtures thereof with or without the addition of metals are used.

With the introduction of individual layers of the covalent hard material the crystallite growth and consequently, the epitosis of the metallic hard material layers is interrupted whereby the number of the interface areas is increased. The covalent hard material layers have a high hardness and chemical stability at temperatures of about 1000° C. As a result, these hard material layers form within the multi-layer wear protection layer a diffusion barrier and an effective protection against corrosion of the metallic hard materials.

The final outermost individual layer can be, depending on the area of application, a metallic hard layer or a covalent hard material layer. Preferably, the outermost individual layer comprises layers of $Si_3N_4$, Sialon, carbon, BN or a metallic hard material.

Altogether, the number of individual layers is preferably between 10 and 1000. A high quality wear protection layer is obtained with at least about 150 individual layers. The thickness of the metallic hard material layers is preferably between 30 and 50 nm whereas—as already mentioned—the thickness of the covalent hard material layers is substantially less and preferably between 1 and 30 nm and even better between 1 and 5 nm. Good results have been achieved with 1 nm thick covalent hard material layers. The total thickness of the wear protection layer may be between 1 and 10 μm.

The wear protective layer according to the invention may be manufactured in a known manner, wherein, with a PVD process, with several cathodes consisting of the respective desired layer material, the material is sputtered in a reactive or non-reactive fashion onto a substrate while the substrate is moved, for example on a turning table, periodically below the cathodes. As substrates especially tool steels and hard metals (group K, P, M) are particularly suitable.

Below the invention will be described in greater detail on the basis of the accompanying drawings.

BRIEF DESCRIPTION OF THE DRAWINGS

FIGS. 1a, 1b, 1c and 1d show schematically various embodiments for the wear protection layer according to the invention;

DESCRIPTION OF PREFERRED EMBODIMENTS

FIGS. 1a, 1b, 1c and 1d show schematically four embodiments of wear protection layers according to the invention, each being disposed on a substrate 1. The representation is to be understood to indicate that the combination of the three individual layers is repeated periodically over and over for the full thickness of the wear protection layer as indicated by the dots. In each case, there are provided two individual layers of TiC and TiN which are sandwiched between two individual layers of $B_4C$. In the two embodiments shown in FIGS. 1a and 1c, the first and the final of the individual layers consist of TiN and TiC, respectively. In the embodiments shown in FIGS. 1b and 1d, the first individual layer consists of TiN and TiC, respectively, and the final individual layer consists of $B_4C$. The total number of the layers of the embodiments shown is 150. The thickness of the metallic hard layer is generally between 30 and 50 nm whereas the layers of $B_4C$ have the same thickness of 1 to 3 nm in all four embodiments. The total layer thickness of the four embodiments is between 2 and 5 μm.

The following test results refer to a wear protection layer as shown schematically in FIG. 1a comprising TiN/TiC/AlN; TiN/TiC/SiC or TiN/TiC/Ti(B,C) individual layers with about 2 nm thick covalent individual layers and a total thickness of about 5 μm. The wear protection layers are, in any case disposed on a hard metal substrate.

Figure 2:
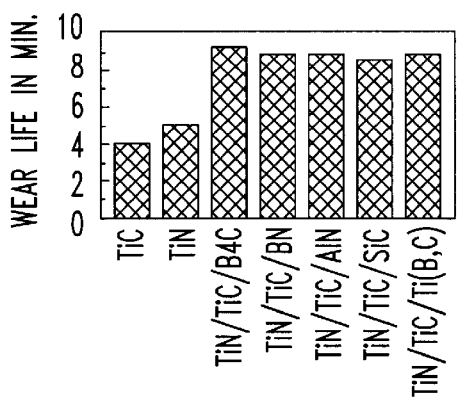
FIG. 2 shows the wear life of wear protection layers of TiC and TiN in comparison with wear protection layers according to the present invention.

FIG. 2 shows the wear life in [min] of various hard material layers in a continuous cutting test. The cutting speed was 250 m/min, the advance was 0.32 mm/rotation and the cutting depth was 2 mm. The cutting test was continued up to the failure of the plate. It showed that the wear protection layer TiN/TiC/$B_4C$ had almost twice the wear life of wear protection layers consisting of a 5 μm thick single layer of TiC or TiN on a hard metal substrate. The other wear protection layers provided for a similar wear life as indicated in FIG. 2.

Figure 3:
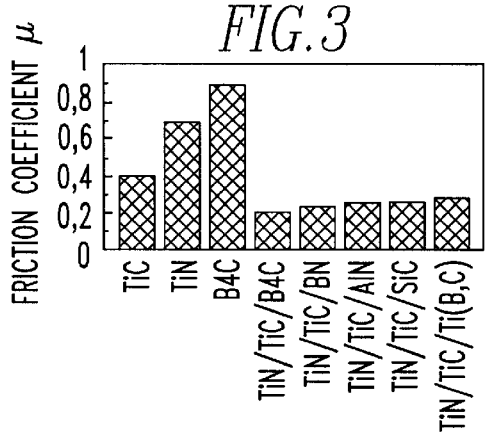
FIG. 3 shows the friction coefficients of prior art wear protection layers in comparison with those of wear protection layers according to the invention.

FIG. 3 shows the friction coefficients [μ] of various hard material layers. The opposite test body consisted of a ball of 100 $Cr_6$. The friction coefficient of the TiN/TiC/$B_4C$ wear protection layer is only a fraction of the friction coefficient of single layer 5 μm thick TiN- or TiC-layers. Although the top individual layer of the wear protection layer TiN/$B_4C$ consists of TiC, the friction coefficient is substantially smaller than that of a single 5 μm thick layer of TiC. Slightly higher friction coefficients were obtained for the other wear protection layers as shown in FIG. 3.

Figure 4:
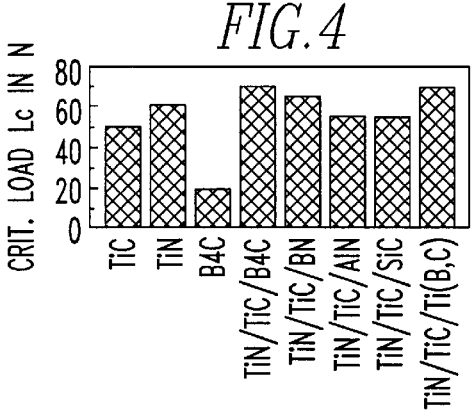
FIG. 4 shows the adherence of prior art wear protection layers in comparison with that of layers made in accordance with the invention.

FIG. 4 shows the adherence of hard material layers to a substrate of hard metal K 10–20, that is, the critical load required to disturb the wear protection layer (scratch test, critical load $L_c$ in [N]. The adherence of the wear protection layers TiN/TiC/$B_4C$; TiN/TiC/BN and TiN/TiC/Ti(B,C) is clearly better than the adherence of a single TiN layer although the first individual layer of the wear protection layer according to the invention consists of TiN. The adherence of the other wear protection layers is only slightly worse than that of a single TiN layer.

Figure 5:
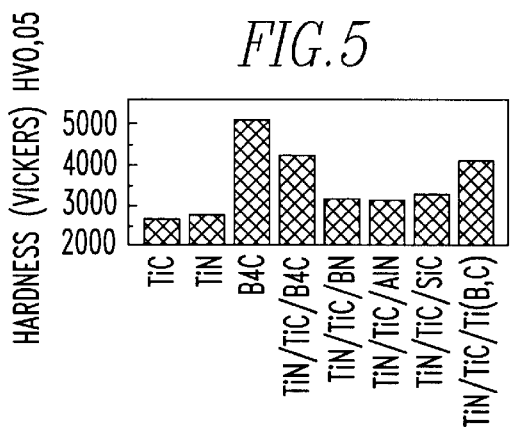
FIG. 5 shows the micro-hardness of prior art wear protection layers in comparison with that of layers according to the invention.

FIG. 5 shows a comparison of the micro-hardness HVO, 05 (Vickers hardness) of various wear protection layers. The hardness of the wear protection layers TiN/TiC/$B_4C$ and TiN/TiC/Ti(B,C)) is close to the hardness of a single B$_4$C layer and substantially exceeds the hardness of TiN or respectively, TiC layers.

Figure 6:
FIG. 6 is a TEM photo showing an embodiment of the wear protection layer according to the invention.

FIG. 6 shows a TEM photo of the wear protection layer TiN/TiC/B$_4$C. It is clearly apparent that the epitasis of the individual TiN/TiC layers is interrupted by the individual B$_4$C layers.

What is claimed is:

1. A wear protection layer disposed on a substrate, comprising a plurality of individual layers including a first individual layer of a hard metallic material disposed directly on said substrate and, disposed on said first individual layer of a hard metallic material, a periodically repeated composite arrangement of three individual layers comprising two individual layers of titanium nitride and titanium carbide and one individual layer consisting of boron carbide with a covalent hard material disposed between said two individual layers of titanium nitride and titanium carbide.

2. A wear protection layer according to claim 1, wherein the number of individual layers is between 10 and 1000.

3. A wear protection layer according to claim 1, wherein the thickness of the individual layers of covalent hard material is at most one half the thickness of the individual layers of metallic hard materials.

4. A wear protection layer according to claim 1, wherein the thickness of the individual layers of said covalent hard material is between 1 and 30 nm.

5. A wear protection layer according to claim 1, wherein the total thickness of said wear protection layer is between 1 and 10 $\mu$m.

* * * * *